United States Patent [19]
Costantini et al.

[11] 3,750,782
[45] Aug. 7, 1973

[54] HIGH SPEED OVERRUNNING CLUTCH

[75] Inventors: Siro J. Constantini, Dearborn Heights, Thomas R. Stockton, Ann Arbor, both of Mich.

[73] Assignee: Ford Motor Company, Dearborn, Mich.

[22] Filed: Oct. 8, 1971

[21] Appl. No.: 187,722

[52] U.S. Cl. ................................ 192/45, 192/42
[51] Int. Cl. ........................................ F16d 15/00
[58] Field of Search ......................... 192/45, 42; 188/82.84

[56] References Cited
UNITED STATES PATENTS

| 1,955,698 | 4/1934 | Bushong | 192/45 X |
| 3,087,591 | 4/1963 | Whitney et al. | 192/45 |
| 1,947,703 | 2/1934 | Fishburn | 192/45 |
| 2,562,196 | 7/1951 | Lewis | 192/45 X |

FOREIGN PATENTS OR APPLICATIONS

| 998,586 | 7/1965 | Great Britain | 192/45 |
| 320,670 | 8/1934 | Italy | 192/45 |

*Primary Examiner*—Allan D. Herrmann
*Attorney*—Keith L. Zerschling and Donald J. Harrington

[57] ABSTRACT

An overrunning clutch adapted especially for use in an engine starter motor drive for a high speed gas turbine engine comprising a driving inner race, a cammed outer race adapted to be connected drivably to a gas turbine gasifier, clutch rollers disposed in cam recesses between said races, friction blocks situated between the individual rollers and adjacent reaction walls on the outer race and springs enclosed within the reaction blocks, the latter limiting the degree of tangential movement of the rollers and retarding their rate of displacement while controlling the orientation of the rollers with respect to the outer race.

4 Claims, 5 Drawing Figures

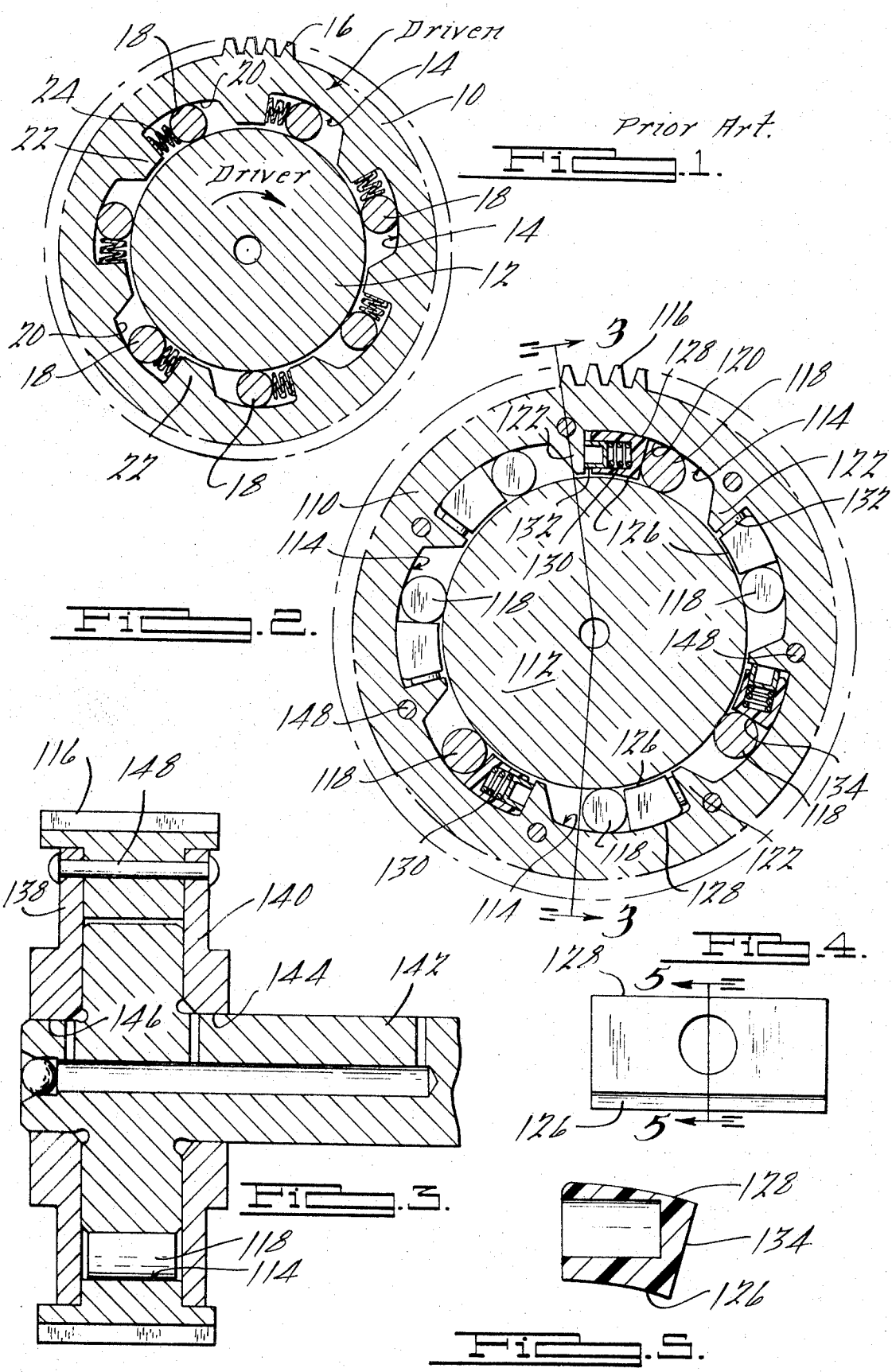

3,750,782

HIGH SPEED OVERRUNNING CLUTCH

GENERAL DESCRIPTION OF THE INVENTION

Our invention relates generally to improvements in overrunning clutches adapted for use in a starter motor drive for a gas turbine gasifier. The clutch is adapted to deliver driving torque from a starter motor shaft, which may be powered by an electric starter motor, to a compressor turbine in the gasifier section. It is necessary for the clutch to deliver torque from the starter motor shaft at speeds that range from zero rpm to relatively high driven speeds that might range as high as fifty percent of the maximum operating turbine speed. Such driven speeds may range as high as 8000 rpm in one embodiment of a gas turbine power plant for use with wheeled vehicles.

We are aware of certain prior art on clutch designs for starter motor driveline installations for gas turbines. (See, for example, U.S. Pat. Nos. 2,177,653, 3,014,567, 3,054,488 and 3,084,774). These comprise a driven cam ring connected drivably to or formed integrally with a torque input element of the gasifier drivetrain. The driven shaft is connected to or is formed integrally with the inner race of the clutch within the cam ring or outer race. Clutch elements in the form of rollers are disposed in cam recesses in the cam ring and these grip the outer periphery of the inner race. Individual spring elements apply a continuous tangential force to the rollers to maintain them in clutching engagement with the inner race and with the cam recesses of the outer race. Such overrunning clutch designs, when used in a high speed torque delivery mechanism, are subject to rapid failure because of the inertia forces acting on the rollers which cause clutch roller throwout that "bottoms-out" the clutch springs and which produces unequal loading on the rollers under certain operating conditions. In a starter motor driveline of this kind instantaneous torque interruption can occur as the rollers are driven out of clutching engagement with the inner race. This is followed by a sudden load application which creates shock forces which score the surfaces of the race and produce flat spots on the rollers themselves. This in turn leads to erratic clutch operation. Also, the random engagement and reengagement of the rollers during operation causes the rollers to become skewed thereby aggravating the undesirable skidding or braking action of the individual rollers.

The improved overrunning clutch design of our invention includes a spring block, preferably made of nylon, which registers with the inner wall of the cam recess formed in the outer clutch race. The block receives the individual roller springs and acts directly upon the rollers to produce tangential clutch engaging forces. The blocks, the rollers and the recesses that receive the blocks are designed so that a controlled radial displacement of the rollers is achieved. The blocks and the rollers are designed also for controlled tangential movement which avoids skewing of the rollers with respect to the races as the rollers are engaged and disengaged.

The blocks are capable of moving a predetermined amount in a tangential direction during clutch operation thereby creating tangential friction forces which modify the clutch roller throw-out forces thereby making it possible to achieve a controlled clutch roller movement to contribute to prolonged clutch life and more reliable clutch operation under the high speed driving conditions that are present in a starter motor driveline for a gas turbine gasifier section.

BRIEF DESCRIPTION OF THE FIGURES OF THE DRAWINGS

FIG. 1 shows an overrunning clutch of a prior art design and intended for use in a gas turbine starter driveline.

FIG. 2 is an assembly view of our improved overrunning clutch design.

FIG. 3 is a cross sectional view taken along the plane of section line 3—3 of FIG. 2.

FIG. 4 is a detailed view of a spring block used in the assembly of FIG. 2.

FIG. 5 is a cross sectional view taken along the plane of section line 5—5 of FIG. 4.

PARTICULAR DESCRIPTION OF THE INVENTION

FIG. 1 shows a prior art clutch design comprising an outer clutch race 10, an inner clutch race 12 and cam recesses 14 formed in the outer race 10. Gear teeth 16 are formed in or are connected directly to the outer race 10. These form a torque input gear for a starter motor drive for use in an environment of the type described previously. The inner race 12 is connected to a starter motor driving shaft. The gearing that connects the outer race to the gas turbine gasifier section multiplies the velocity of the inner race 12 so that the driven speed of the gasifier turbine section at the instant the gas turbine becomes capable of sustained operation is about 8000 rpm.

The cam recesses 14 each receive a clutch roller 18. Each roller engages a cam surface 20 formed in the recesses 14. A reaction wall 22 is located between each pair of rollers 18. A compression spring 24 is situated between each wall 20 and the companion roller 18 is adapted to urge its respective roller into camming engagement with the adjacent cam surface 20. A comparison of the mode of operation of the structure of FIG. 1 with our improved structure will be made following a brief description of the principal structural characteristics of our improved design.

Our clutch design is illustrated in FIGS. 2 and 3. The driver, which is connected to and formed integrally with the inner race, is identified by reference character 112. The outer race 110 surrounds the inner race 112 and is formed with gear teeth 116. Teeth 116 mesh with a companion gear of the starter motor driveline in the manner described previously.

The outer race 110 is formed with cam recesses 114, each of which receives a clutch roller 118. Located between each pair of rollers is an abutment or end wall 122, which forms one side of a recess 114.

Recesses 114 are formed with cam surfaces 120 which are engaged by the rollers 118. Reaction blocks 126 are received within the recesses 114 and located between each abutment 122 and adjacent roller 118. The outer surface 128 of each reaction block 126 is contoured so that it matches the adjacent contour of its recess 114. A clutch spring 130 is received within the pocket formed in each reaction block 126. A spring seat 132 is received within the central opening in each reaction block 126 to provide an anchor for the companion spring 130. The seat 132 engages abutment 122.

When the clutch is assembled as shown in FIG. 2, a clearance exists between the abutment 122 and the adjacent end of the reaction block 126. This clearance may be approximately 0.040 of an inch.

The side 134 of each reaction block 126 engages one of the adjacent rollers 118 throughout substantially its entire length so that the roller at all times is maintained in a precise axial disposition. Parallelism of the axes of the rollers 118 and the axis of the inner race then is maintained.

As indicated in FIG. 3, side plates 138 and 140 located on the adjacent axial sides of the clutch assembly maintain the rollers and the reaction blocks in assembled relationship. The side plates 138 and 140 may provide concentricity between the outer race and the inner race. The inner race may be connected to or may be formed integrally with a driving shaft 142, which may be journaled within openings 144 and 146. In the side plates 138 and 140 respectively, the outer race and the side plates can be assembled together by rivets 148.

The reaction blocks 126 prevent radial displacement of the springs during operation. They also limit tangential travel of the rollers as the clutches are engaged and disengaged. Whenever the rollers become disengaged due to high speed operation and the accompanying centrifugal force acting on the rollers, the reaction blocks 126 are displaced in a tangential direction a predetermined amount thereby creating friction forces between the surface 128 and the adjacent surface of recess 114.

During operation, starting torque is obtained as load is applied to the input gear of the starter motor driveline. This may initiate torsional vibration of a spring-mass system in the driveline due to the inherent resiliency of the starter motor shaft and the driving connection between the shaft and the inner race. This torsional vibration during start-up causes a torque reversal for each cycle of the vibration. Each torque reversal tends to cause the individual rollers to roll out of camming engagement with their respective cam surfaces. The "roll-out" velocity is relatively high. In an arrangement such as that shown in the prior art construction of FIG. 1, the rollers would "bottom-out" and flatten the individual roller springs. During such a torque reversal, the starter becomes momentarily unloaded thereby causing the inner race to overspeed the outer race. Upon completion of the vibration cycle, the rollers return to the original contact position. In a design of the type shown in FIG. 1, the rollers are returned usually in a skewed position thereby causing erratic clutching operation and skidding of the rollers on the inner race.

During a momentary torque interruption, the inner race driving speed increases, but the speed difference is abruptly cancelled by the skidding or braking action of the rollers during the latter phase of the vibration cycle. The skidding, which is aggravated by the skewing of the rollers, develops flat spots on the rollers and scores the inner race. This advantage is avoided in our present design because roller movement in a tangential direction is limited by the predetermined clearance between the reaction blocks and the adjacent abutments of the outer race. Sufficient tangential motion is permitted to provide the necessary running clearance between the rollers and the inner race. This minimum running clearance permits rapid return of the rollers into clutching engagement if torque interruption occurs due to transitional vibrations in the spring mass vibration system of the starter driveline.

The flattening and hammering forces of the rollers against the springs due to the clutch roller "throw-out" forces are avoided in our improved design because the springs are protected by the surrounding reaction blocks.

After the gasifier section of the turbine is accelerated to a predetermined speed and after the starter motor is deactivated, starter motor torque is interrupted. At that instant, the driving speed of the inner race 112 falls rapidly. This tends to cause the rollers to move rapidly in a "roll-out" direction. In a design such as that shown in FIG. 1, this rapid "roll-out" causes the rollers to impact again the hammering forces on the springs. This condition is avoided in our improved design because the "roll-out" forces on the rollers are absorbed by the reaction blocks. In a preferred embodiment, the reaction blocks are formed of nylon which cushions the impact force of the rollers and absorbs the impact energy.

Usually the cutout speed is approximately 50 percent of the maximum engine speed. Under certain abnormal conditions, it is possible that the cutout of the starter will be delayed. In these circumstances, the rollers may tend to leave their clutching positions under the influence of the excess centrifugal force that is developed. This is possible because of the the reduction of driving torque that accompanies an increase in driving speed. The reduction in torque is due to the speed-torque characteristics of the electric driving motor. The roller with the lightest spring is the one that would be centrifuged in a "roll-out" direction in advance of the others. As the speed continues to increase, the other rollers tend to be thrown out one by one. In each instance, the rollers would be impacted against their springs which, in prior art designs, would cause the spring flattening problem mentioned earlier. As the last roller, or perhaps the last pair of rollers, leaves the peripheral surface of the inner race during acceleration of the gasifier section, they are drawn back into contact with the peripheral inner race surface due to the frictional drag between the rollers and the inner race surface. This would occur when the speed of the driven member falls sufficiently to reduce the centrifugal force acting on that roller or a pair of rollers. As soon as the rollers reengage, a skidding again occurs in prior art designs and flat spots tend to occur. This is aggravated as before by the skewing action. This problem is avoided also with our improved design because the reaction blocks in our improved design prevent skewing from occurring. Also the limited roller travel provided by the reaction blocks eliminates the speed differential that exists under these special operating conditions.

Having thus described the preferred form of our invention, what we claim and desire to secure by U.S. Letters Patent is:

1. An overrunning clutch adapted to be used in a high speed driveline for transferring torque from a driving shaft to a driven shaft, an inner race connected to one shaft, an outer race connected to the other shaft, cam recesses formed in said outer race, a clutch roller situated in each recess, a plurality of reaction shoulders formed in said outer race, one shoulder being situated between each pair of rollers, a reaction block formed of shock absorbing, resilient material situated between each reaction shoulder and the adjacent roller, a spring opening formed in each reaction block, and a compression spring in each spring opening, each spring acting on the adjacent reaction shoulder and on its reaction block whereby tangential forces applied to the adjacent roller tend to urge it into camming engagement with the wall of the adjacent cam recess, a predetermined clearance between each reaction shoulder and the adjacent reaction block, the outward surface of said reaction block slidably and frictionally engaging the wall of its cam recess, said rollers moving out of clutching engagement with the inner race under the influence of centrifugal forces acting thereon as said reaction blocks are displaced tangentially and urged into engagement with the adjacent reaction shoulder.

2. The combination as set forth in claim 1 wherein said reaction blocks are formed with an outer surface having a contour that substantially matches the contour of the adjacent wall of said cam recesses, one axial side of said reaction block engaging the adjacent roller throughout substantially its entire length thereby preventing skewing of the roller with respect to the races.

3. The combination as set forth in claim 1 wherein the maximum compression of said springs is equal to the clearance of said reaction block with respect to the adjacent reaction shoulder thereby avoiding flattening of the springs due to centrifugal forces acting on the rollers, the centrifugal force acting on the reaction blocks creating friction forces upon displacement of the reaction blocks relative to the outer race thereby modifying the rate of roll-out of the rollers upon overspeeding of the outer race.

4. The combination as set forth in claim 2 wherein the maximum compression of said spring is equal to the clearance of said reaction block with respect to the adjacent reaction shoulder thereby avoiding flattening of the springs due to centrifugal forces acting on the rollers, the centrifugal forces acting on the reaction blocks creating forces upon displacement of the reaction blocks relative to the outer race thereby modifying the rate of roll-out of the rollers upon overspeeding of the outer race.

* * * * *